United States Patent
Kotta et al.

(10) Patent No.: US 11,074,194 B2
(45) Date of Patent: Jul. 27, 2021

(54) MANAGING DIRECT MEMORY ACCESS

(71) Applicant: International Business Machines Corporation, Armonk, NY (US)

(72) Inventors: Sakethan Reddy Kotta, Serilingampally (IN); Eric Norman Lais, Georgetown, TX (US); Rama Krishna Hazari, Telangana (IN); Kumaraswamy Sripathy, Hyderabad (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/281,151

(22) Filed: Feb. 21, 2019

(65) Prior Publication Data

US 2020/0272578 A1  Aug. 27, 2020

(51) Int. Cl.
*G06F 12/1081* (2016.01)
*G06F 12/0891* (2016.01)
*G06F 12/0831* (2016.01)

(52) U.S. Cl.
CPC ...... *G06F 12/1081* (2013.01); *G06F 12/0833* (2013.01); *G06F 12/0891* (2013.01); *G06F 2212/621* (2013.01)

(58) Field of Classification Search
CPC ............. G06F 12/1081; G06F 12/0891; G06F 12/0833; G06F 2212/621
See application file for complete search history.

(56) References Cited

U.S. PATENT DOCUMENTS

| | | | | |
|---|---|---|---|---|
| 3,979,726 A | * | 9/1976 | Lange | G06F 12/0864 711/135 |
| 6,785,759 B1 | * | 8/2004 | Beukema | G06F 12/0292 710/308 |
| 7,426,627 B2 | * | 9/2008 | Wooten | G06F 12/1081 711/141 |
| 8,171,230 B2 | * | 5/2012 | Freimuth | G06F 12/1081 711/145 |
| 9,547,603 B2 | | 1/2017 | Basu et al. | |
| 10,169,186 B1 | | 1/2019 | Dusanapudi et al. | |
| 2006/0190685 A1 | * | 8/2006 | Arndt | G06F 12/0837 711/118 |
| 2017/0060770 A1 | | 3/2017 | Arroyo et al. | |
| 2017/0177498 A1 | * | 6/2017 | Wilkes | G06F 12/1027 |

OTHER PUBLICATIONS

"Caching Critical Physical Adapter State Characteristics in a High-Availability Environment", An IP.com Prior Art Database Technical Disclosure, Authors et. al.: Disclosed Anonymously, IP.com No. IPCOM000241505D, IP.com Electronic Publication Date: May 7, 2015, 4 pages.
Mell et al., "The NIST Definition of Cloud Computing", Recommendations of the National Institute of Standards and Technology, Special Publication 800-145, Sep. 2011, 7 pages.

* cited by examiner

*Primary Examiner* — Kalpit Parikh
(74) *Attorney, Agent, or Firm* — David K. Mattheis; William H. Hartwell; Nicholas L. Cadmus

(57) ABSTRACT

Managing direct memory access (DMA) by: defining a translate control entity (TCE) cache flag for cache memory addresses, receiving a DMA TCE related request, checking the TCE cache flag status, and completing the TCE related request according to the TCE cache flag status.

20 Claims, 4 Drawing Sheets

MANAGING DIRECT MEMORY ACCESS

BACKGROUND

The disclosure relates generally to managing system resources for direct memory access. The disclosure relates particularly to enhancing direct memory access by managing direct memory access requests related to translate control entities.

System memory may be logically partitioned into Partitionable Endpoints (PE). PE represent memory portions. Logical partitioning (LPAR) divides the resources of a computer system among different partitions, which then act independently. A partitionable endpoint (PE) is a memory portion which may be assigned a distinct input/output (IO) address.

Direct memory access (DMA) enables system elements other than the CPU, to issue load and store command and access memory directly without utilizing CPU resources. Translate Control Entries (TCE) are used to map IO addresses of PE to main memory addresses in support of DMA. This mapping ensures that IO Adapters (IOA) can safely DMA to and from main memory but are only allowed access to memory for which the adapter has access authority. Objects retrieved by DMA may be stored in a TCE cache memory.

SUMMARY

Aspects of the invention disclose methods, systems and computer readable media associated with managing direct memory access (DMA) of computer processors by: defining a translate control entity (TCE) flag for elements of the system memory, receiving a DMA TCE related request, checking, the status of the TCE flag, and completing the TCE related request according to the TCE flag status.

In one aspect, the DMA management relates to processing requests to end previous commands associated with particular partitionable elements of the system. The defined TCE flags enable a more efficient ending to the previous commands.

In one aspect, the disclosure relates to DMA access requests to read memory contents. In this aspect the request is managed more efficiently as the defined TCE flags enable more rapid and efficient decisions regarding where the requested contents reside.

DETAILED DESCRIPTION

Figure 1:
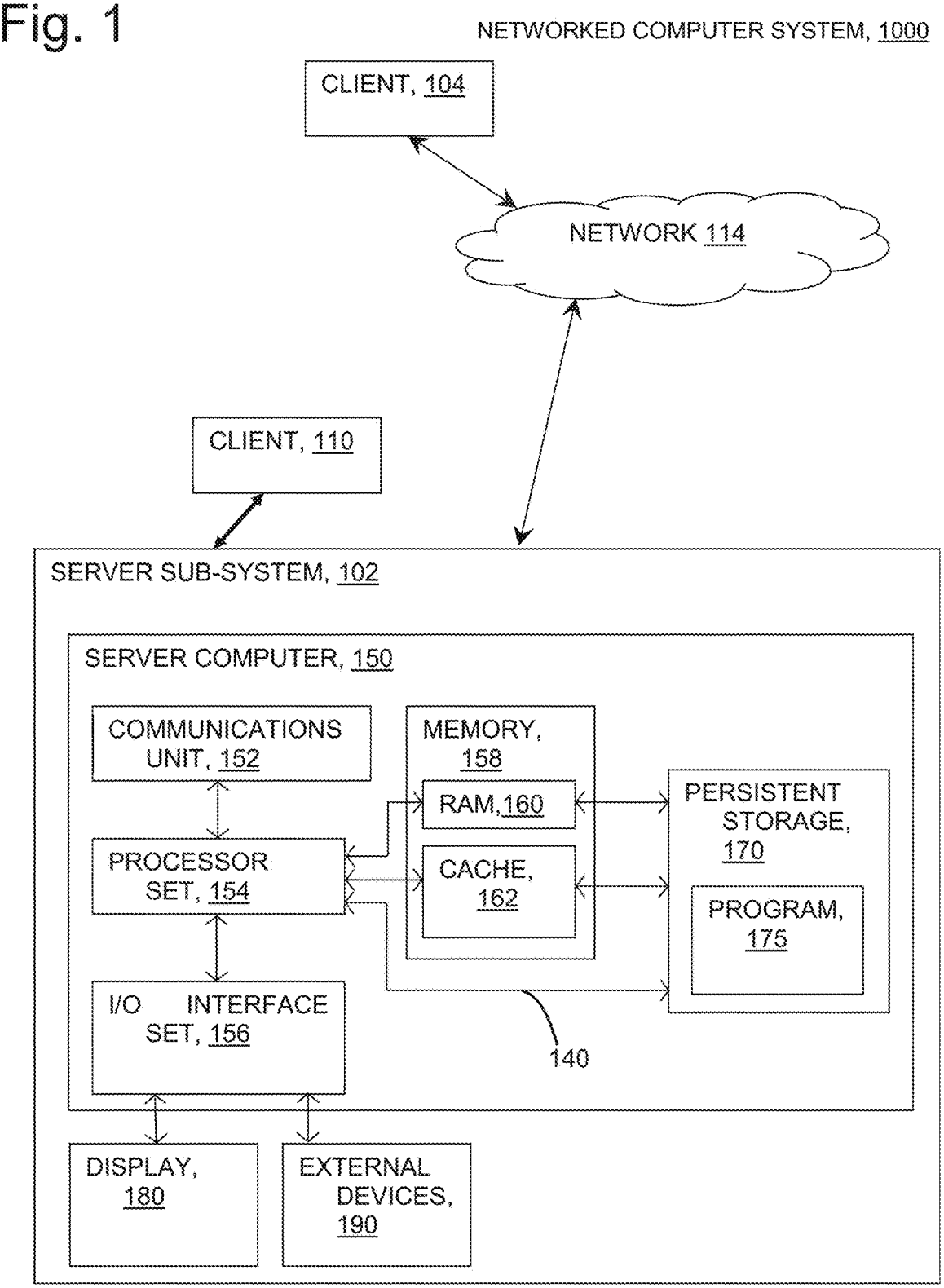
FIG. 1 provides a schematic illustration of a system, according to an embodiment of the invention.

Efforts to improve system performance and handle ever-growing IO speed demands have led to increases in the size of the TCE cache memory of Peripheral Component Interconnect express (PCIe) Host Bridge (PHB) cache from 64 to 1024 entries. To avoid high hardware costs and complexity associated with implementing Content-Addressable-Memory for faster cache searching, the architecture includes a Set Associative Cache rather than a Fully Associated Cache. The use of the Set Associative Cache structure results in cache search times increasing from 1 cycle to more than 512 cycles per search. Improvements to the architecture are needed to reduce the clock cycle operating cost of using the Set Associative structure with the increased number of TCE cache entries for DMA.

For TCE coherency, firmware issues a TCE Data Kill (Dkill) command to clear addresses after the DMA completes. Fully Associated Cache completes the Dkill operation in a single clock cycle in the PHB via a memory mapped IO (MMIO). For the Set Associative Cache structure, the single TCE Dkill operation may take 10 to 512 clock cycles due to the searching of the cache necessary to execute the Dkill operation.

A PHB may receive various levels of TCE Dkill commands. TCE level, PE level, and entire cache level kill operations may be requested. TCE Dkill clears a single TCE cache address. A PE Dkill, clears all cached entries for the specified PE. A TCE Kill All Entries command clears all entries in the cache of PEs. The use of the PE Kill requires all PE addresses be searched for cached content and then cleared. Similarly, the TCE Kill All Entries requires that all entries be searched and cleared of cached content. Each of these operations potentially consumes clock cycles while searching empty addresses prior to clearing the addresses.

Consecutive PE Kill commands may consume more clock cycles as all PE addresses may be searched by the subsequent command even though no new content has been written to the PE.

In an embodiment, TCE cache is managed by defining one or more TCE cache flags for each PHB of the system. The flags are defined and held in a cache on the PHB chip. The TCE cache flags may be selected from a group including "PE TCE Cache Empty" flag for each PE under the PHB as well as a "Total TCE Cache Empty" flag for each PHB, and combinations of the two. In an embodiment, the PE TCE Cache Empty flags may be held as part of the individual PHB hardware of the PHB chip. Bits corresponding to a flag for each PE of the PHB, as well as bits for the Total TCE Cache Empty flag are provided on the PHB chip. The defined bits are initially set high indicating cache empty status for all PEs and PHB. As data is written to the PE's cache during a DMA initiation, the flags are cleared to a low value indicating that the PE TCE Cache and Total TCE Cache (PHB cache) are not empty.

In an embodiment, upon receiving, a DMA TCE kill related request, the system will check the status of the relevant TCE flags. For a TCE Kill All request, seeking to clear the entire TCE cache, the PHB will return success immediately, completing the operation in a single clock cycle, if the PHB's Total TCE Cache Empty flag is set. If the flag is not set, the operation will traverse through all "PE TCE Cache Empty flags" under the PHB killing all entries under PEs, whose PE TCE Cache Empty flag is not set. As soon as the cache entries are killed under a PE, the PE Cache Empty flag is set. After finishing the last affected PE, the PHB Total TCE Cache Empty flag will be set. Subsequent clearing requests, prior to any DMA load operations for the PEs, will result in a single clock cycle request as the flags have been set.

In an embodiment, upon receiving a PE level clear request, the system will check PE TCE Cache Empty flag for the relevant PE. The PHB returns immediate success and completes the operation in a single cycle if the PE TCE Cache Empty flag is set. If the flag is not set, the operation proceeds, clearing each entry of the PE and then setting the PE TCE Cache Empty flag. Subsequent requests for PE clearing prior to a DMA load to the PE result in a single cycle completion of the request.

In an embodiment, upon receiving a TCE kill request, the system checks the relevant PE TCE Cache Empty flag. The PHB returns immediate success if the flag is set and the operation completes in a single cycle. If the flag is not set, the relevant TCE entry is cleared. No flag is set as other entries of the PE may contain cached data.

In an embodiment, the flags are checked when processing a DMA load request. PHB TCE Cache with the Total TCE Cache Empty flag set will not be searched for the requested data and proceeds to fetch the requested data from regular memory as the data is not stored in the cache. If the Total TCE Cache Empty flag is not set, then the operation continues to check for PE TCE Cache Empty flag. PEs with the PE TCE Cache Empty flag set will not be searched. If the flag is set for a PE, the search proceeds, fetching the requested data from regular memory as the data is not stored in the cache. PEs with the cache flag not set will be searched for the data. Data found in the cache will be loaded. Regular memory will be searched for data not found in the cache and the data will be fetched.

FIG. 1 provides a schematic illustration of exemplary computing resources associated with practicing the disclosed inventions. The inventions may be practiced in the processors of any of the disclosed elements which process DMA using a Set Associative Cache or similar structure. As shown in the figure, a networked Client device 110 connects wirelessly to server sub-system 102. Client device 104 connects wirelessly to server sub-system 102 via network 114. Client devices 104 and 110 comprise application programs (not shown) together with sufficient computing resource (processor, memory, network communications hardware) to execute the programs. As shown in FIG. 1, server sub-system 102 comprises a server computer 150. FIG. 1 depicts a block diagram of components of server computer 150 within a networked computer system 1000, in accordance with an embodiment of the present invention. It should be appreciated that FIG. 1 provides only an illustration of one implementation and does not imply any limitations with regard to the environments in which different embodiments can be implemented. Many modifications to the depicted environment can be made.

Server computer 150 can include processor(s) 154, cache 162, memory 158, persistent storage 170, communications unit 152, IO interface(s) 156 and communications fabric 140. Communications fabric 140 provides communications between cache 162, memory 158, persistent storage 170, communications unit 152, and IO interface(s) 156. Communications fabric 140 can be implemented with any architecture designed for passing data and/or control information between processors (such as microprocessors, communications and network processors, etc.), system memory, peripheral devices, and any other hardware components within a system. For example, communications fabric 140 can be implemented with one or more buses.

Communications fabric 140 includes PHB structures and provides the path over which DMA operations are processed between I/O interfaces and cache memory registers addressed through TCEs in PEs of the cache Memory 158 and persistent storage 170 are computer readable storage media. In this embodiment, memory 158 includes random access memory (RAM). In general, memory 158 can include any suitable volatile or non-volatile computer readable storage media. Cache 162 is a fast memory that enhances the performance of processor(s) 154 by holding recently accessed data, and data near recently accessed, from memory 158.

Program instructions and data used to practice embodiments of the present invention, e.g., operating program 175, are stored in persistent storage 170 for execution and/or access by one or more of the respective processor(s) 154 of server computer 150 via cache 162. In this embodiment, persistent storage 170 includes a magnetic hard disk drive. Alternatively, or in addition to a magnetic hard disk drive, persistent storage 170 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 170 may also be removable. For example, a removable hard drive may be used for persistent storage 170. Other examples include optical and magnetic disks, thumb drives, and smart cards that are inserted into a drive for transfer onto another computer readable storage medium that is also part of persistent storage 170.

Communications unit 152, in these examples, provides for communications with other data processing systems or devices, including resources of client computing devices 104, and 110. In these examples, communications unit 152 includes one or more network interface cards. Communications unit 152 may provide communications through the use of either or both physical and wireless communications links. Software distribution programs, and other programs and data used for implementation of the present invention, may be downloaded to persistent storage 170 of server computer 150 through communications unit 152.

I/O interface(s) 156 allows for input and output of data with other devices that may be connected to server computer 150. For example, I/O interface(s) 156 may provide a connection to external device(s) 190 such as a keyboard, a keypad, a touch screen, a microphone, a digital camera, and/or some other suitable input device. External device(s) 190 can also include portable computer readable storage media such as, for example, thumb drives, portable optical or magnetic disks, and memory cards. Software and data used to practice embodiments of the present invention, e.g., operating program 175 on server computer 150, can be stored on such portable computer readable storage media and can be loaded onto persistent storage 170 via I/O interface(s) 156. I/O interface(s) 156 also connect to a display 180.

Display 180 provides a mechanism to display data to a user and may be, for example, a computer monitor. Display 180 can also function as a touch screen, such as a display of a tablet computer.

Figure 2:
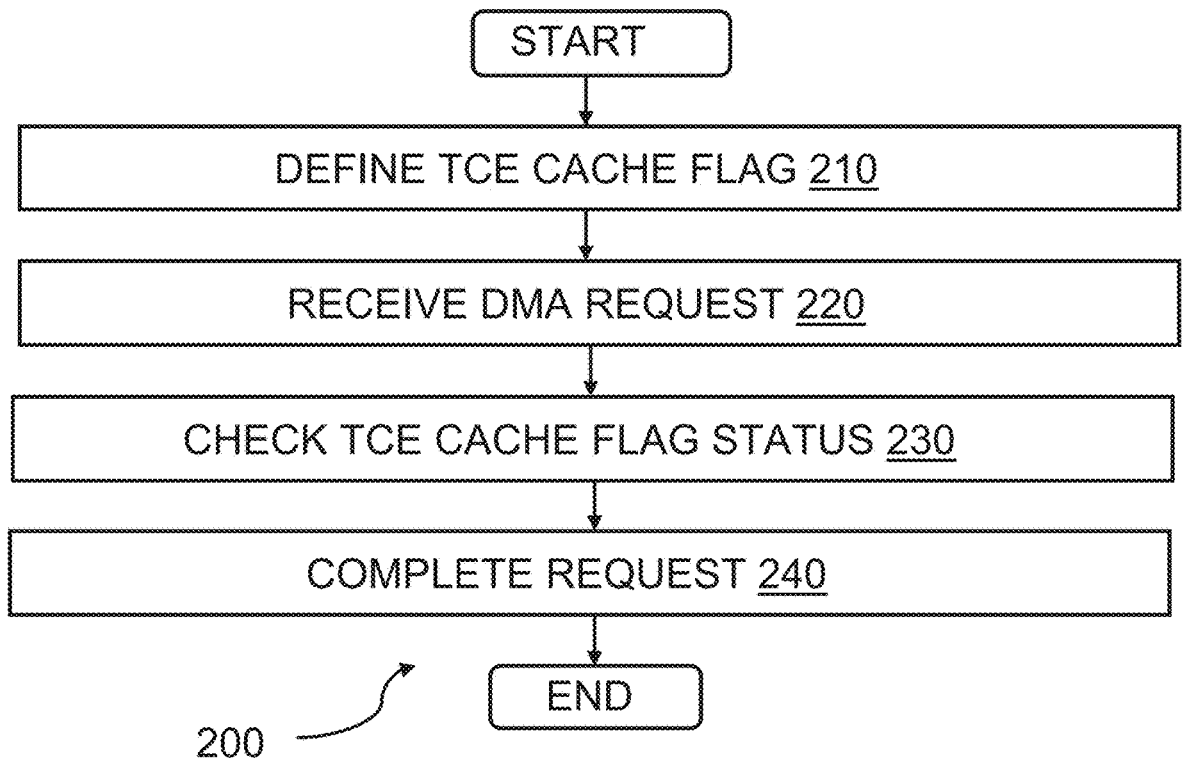
FIG. 2 provides a flowchart depicting an operational sequence, according to an embodiment of the invention.

FIG. 2 provides a flowchart 200, illustrating exemplary activities associated with the practice of the disclosure. After program start, at least one TCE cache flag is defined for a hardware PHB. In an embodiment, at 210 a PE TCE Cache Empty flag is defined for each PE of the system and a Total TCE Cache Empty flag is defined for each PHB of the system. At 220, a DMA request is received. The DMA request may comprise a load or store request, or may comprise a request to kill, or clear, a portion or all the cache. As the operation associated with the request proceeds, the status of the relevant TCE cache flags will be determined at 230.

In an embodiment, a TCE kill all request may be received. When the Total TCE Cache Empty flag is set, the system returns success and the operation completes. When the flag is not set, the operation proceeds and each TCE address is cleared and the Total TCE Cache Empty flag, and all subordinate PE Cache Empty flags, are then set.

In an embodiment, a PE Dkill command may be received. In this embodiment, the status of the PE cache empty flag is checked. Success is returned when the flag is set, and the operation completes. When the flag is not set, the PE cache is cleared, and the PE TCE Cache Empty flag is then set.

In an embodiment, a TCE Dkill request is received. In this embodiment, the PE TCE Cache Empty flag is checked. When the flag is set, the system returns success immediately and the operation completes. When the flag is not set, the specific TCE cache address is cleared. No flag is set for a single TCE address.

In an embodiment, a start DMA request is received. If the Total TCE Cache Empty flag is set, the operation proceeds directly to fetch the TCE from memory without searching the cache further. If the flag is not set, the operation searches the cache. If there is a cache hit, the DMA begins from the cache address. If there is not a hit, the operation proceeds to fetch the TCE from memory.

The requested operation completes at 240 according to the status of the flag(s). For a DMA store request, the flag will be cleared indicating that the address contains cached data. For a load request the flag will be checked to determine if data is present and to shorten the search time when the cache addresses are empty.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3:
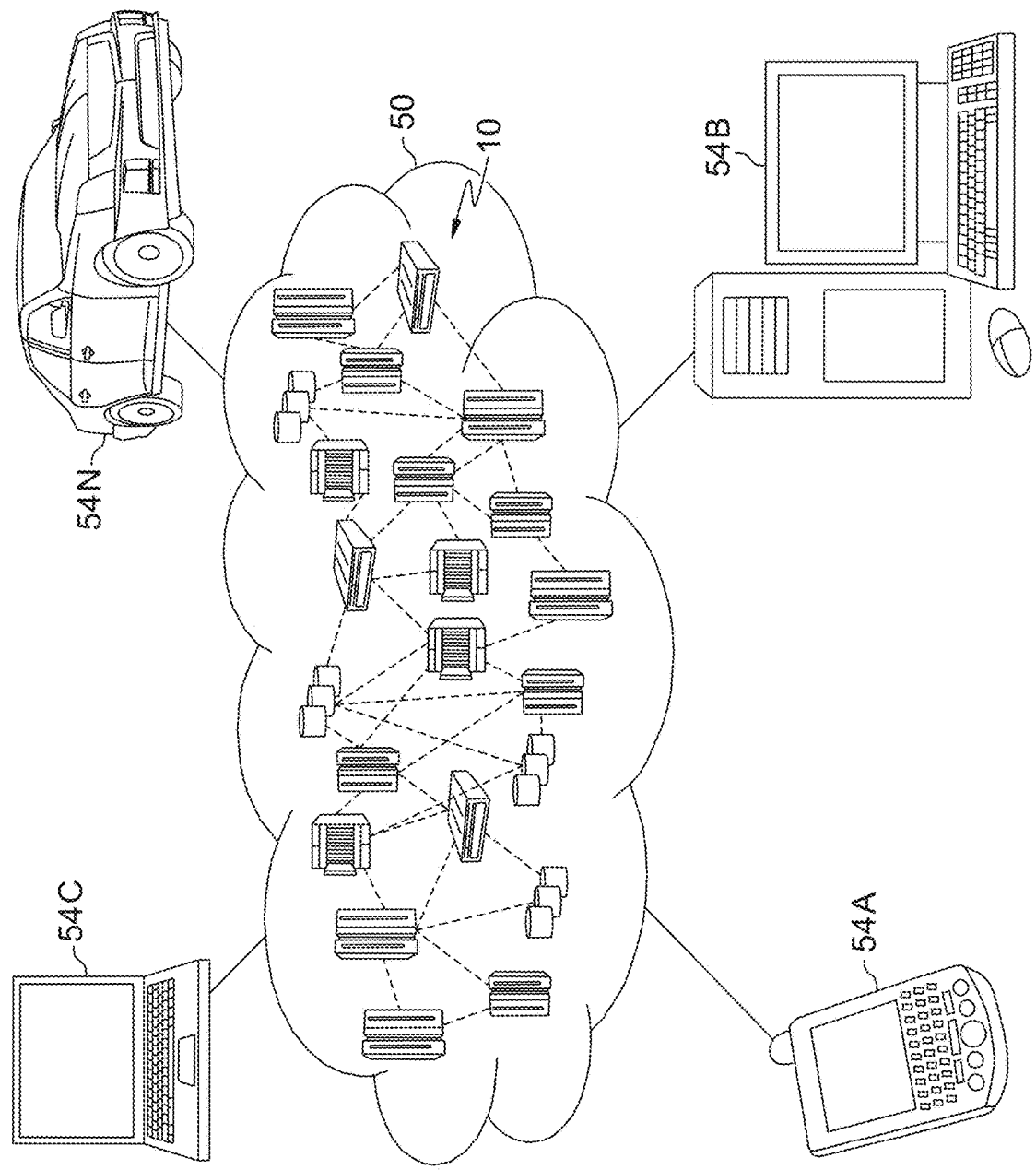
FIG. 3 depicts a cloud computing environment, according to an embodiment of the invention.

Referring now to FIG. 3, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 3 are intended to be illustrative only and that computing nodes 10 and cloud computing environment 50 can communicate with any type of computerized device over any type of network and/or network addressable connection (e.g., using a web browser).

Figure 4:
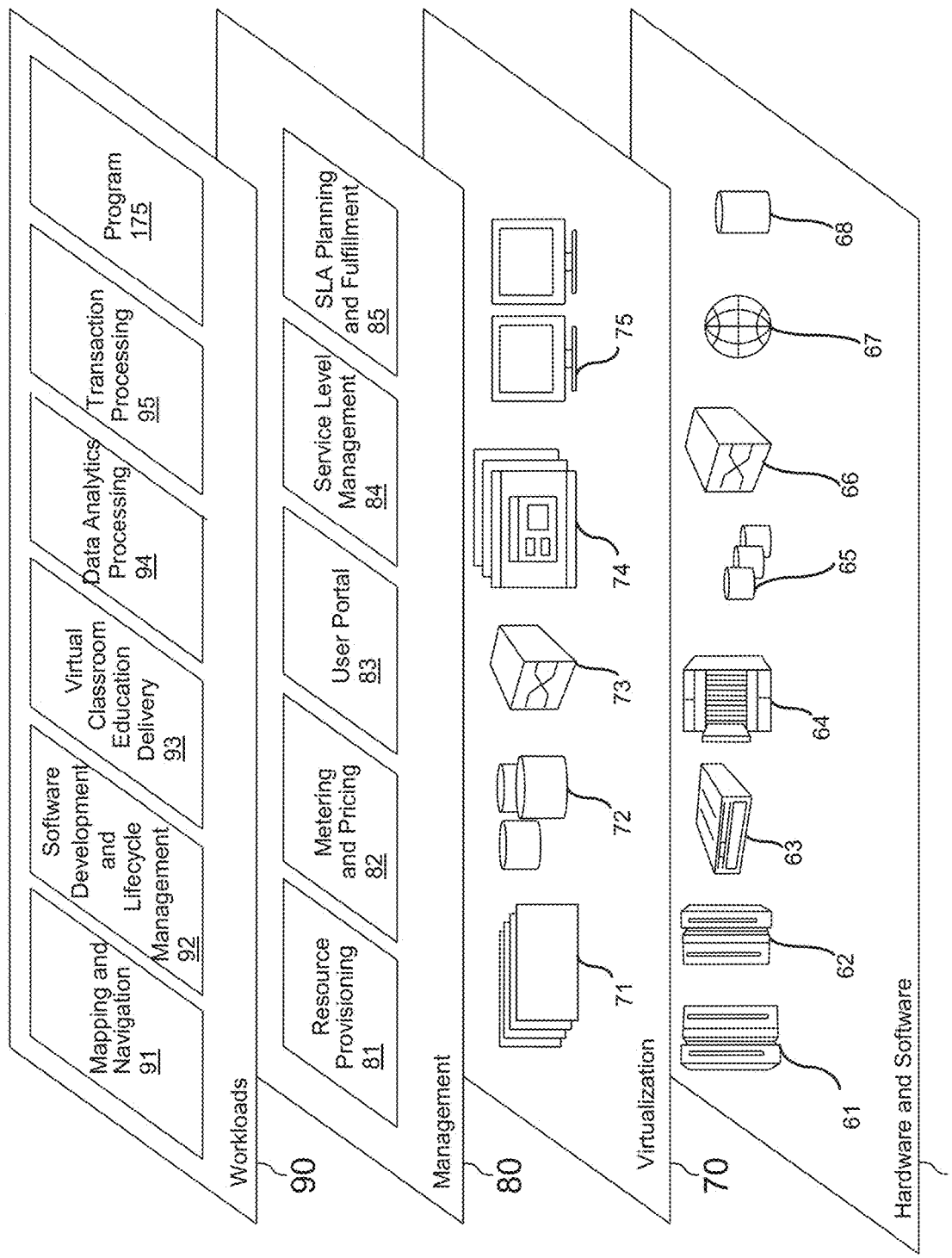
FIG. 4 depicts abstraction model layers, according to an embodiment of the invention.

Referring now to FIG. 4, a set of functional abstraction layers provided by cloud computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and operating program 175.

The present invention may be a system, a method, and/or a computer program product at any possible technical detail level of integration. The invention may be beneficially practiced in any system, single or parallel, which processes an instruction stream. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method for managing direct memory access (DMA) using translate control entities (TCE), the method comprising:
    defining, by one or more computer processors, a set of TCE cache empty flags including a first TCE cache empty flag for a first level of TCE cache associated with a Peripheral Component Interconnect express (PCIe) Host Bridge (PHB), and a second TCE cache empty flag for a second level of TCE cache associated with a Partitionable Endpoint of the PHB, each of the first TCE cache flag and the second TCE cache flag, having a status;
    receiving, by one or more computer processors, a DMA TCE related request;
    checking, by one or more computer processors, the status of at least one of the set of TCE cache empty flags; and
    completing, by one or more computer processors, the DMA TCE related request, at least in part according to the status of the at least one of the set of TCE cache empty flags.

2. The computer implemented method according to claim 1, wherein defining a TCE cache flag comprises defining a TCE cache flag selected from the group consisting of: a Partitionable Endpoint (PE) TCE cache empty flag for each PE, and a Total TCE cache empty flag for each Peripheral Component Interconnect express (PCIe) Host Bridge PHB.

3. The computer implemented method according to claim 1, wherein receiving a DMA TCE related request comprises receiving a TCE kill request.

4. The computer implemented method according to claim 3, further comprising:
    killing all relevant TCE entries; and
    setting the TCE cache flag to empty.

5. The computer implemented method according to claim 1, wherein receiving a DMA TCE related request comprises receiving a DMA start request.

6. The computer implemented method according to claim 5, further comprising:
    fetching the TCE from memory.

7. The computer implemented method according to claim 6, further comprising:
    searching a TCE cache.

8. A computer program product for managing direct memory access using translate control entities, the computer program product comprising one or more computer readable storage media and stored program instructions on the one or more computer readable storage media, the program instructions comprising:
    programmed instructions for defining a set of TCE cache empty flags including a first TCE cache empty flag for a first level of TCE cache associated with a Peripheral Component Interconnect express (PCIe) Host Bridge (PHB), and a second TCE cache empty flag for a second level of TCE cache associated with a Partitionable Endpoint of the PHB, each of the first TCE cache flag and the second TCE cache flag, having a status;
    programmed instructions for receiving a DMA TCE related request;
    programmed instructions for checking the status of at least one of the set of TCE cache empty flags; and
    programmed instructions for completing the TCE related request at least in part according to the status of the at least one of the set of TCE cache empty flags.

9. The computer program product according to claim 8, wherein programmed instructions for defining a TCE cache flag comprise programmed instructions for defining a TCE cache flag selected from the group consisting of: a Partitionable Endpoint (PE) TCE cache empty flag for each PE, and a Total TCE cache empty flag for each Peripheral Component Interconnect express (PCIe) Host Bridge PHB.

10. The computer program product according to claim 8, wherein programmed instructions for receiving a DMA TCE related request comprise programmed instructions for receiving a TCE kill request.

11. The computer program product according to claim 10, the stored program instructions further comprising:
   programmed instructions for killing all TCE request relevant entries; and
   programmed instructions for setting the TCE cache flag to empty.

12. The computer program product according to claim 8, wherein programmed instructions for receiving a DMA TCE related request comprise programmed instructions for receiving a DMA start request.

13. The computer program product according to claim 12, the stored program instructions further comprising:
   programmed instructions for fetching the TCE from memory.

14. The computer program product according to claim 13, the stored program instructions further comprising:
   programmed instructions for searching a TCE cache.

15. A computer system for managing application execution, the computer system comprising:
   one or more computer processors;
   one or more computer readable storage devices;
   stored program instructions on the one or more computer readable storage devices for execution by the at least on computer processor, the stored program instructions comprising:
   programmed instructions for defining a set of TCE cache empty flags including a first TCE cache empty flag for a first level of TCE cache associated with a Peripheral Component Interconnect express (PCIe) Host Bridge (PHB), and a second TCE cache empty flag for a second level of TCE cache associated with a Partitionable Endpoint of the PHB, each of the first TCE cache flag and the second TCE cache flag, having a status;
   programmed instructions for receiving a DMA TCE related request;
   programmed instructions for checking the status of at least one of the set of TCE cache empty flags; and
   programmed instructions for completing the TCE related request at least in part according to the status of the at least one of the set of TCE cache empty flags.

16. The computer system according to claim 15, wherein programmed instructions for defining a TCE cache flag comprises programmed instructions for defining a TCE cache flag selected from the group consisting of: a Partitionable Endpoint (PE) TCE cache empty flag for each PE, and a Total TCE cache empty flag for each Peripheral Component Interconnect express (PCIe) Host Bridge PHB.

17. The computer system according to claim 15, wherein programmed instructions for receiving a DMA TCE related request comprise programmed instructions for receiving a TCE kill request.

18. The computer system according to claim 17, the stored program instructions further comprising:
   programmed instructions for killing all TCE request relevant entries; and
   programmed instructions for setting the TCE cache flag to empty.

19. The computer system according to claim 15, wherein programmed instructions for receiving a DMA TCE related request comprise programmed instructions for receiving a DMA start request.

20. The computer system according to claim 19, the stored program instructions further comprising:
   fetching the TCE from memory.

* * * * *